July 24, 1951 J. A. DAYTON ET AL 2,561,912
APPARATUS FOR MAKING TUFT BUTTONS AND THE LIKE
Filed July 15, 1947 6 Sheets-Sheet 1
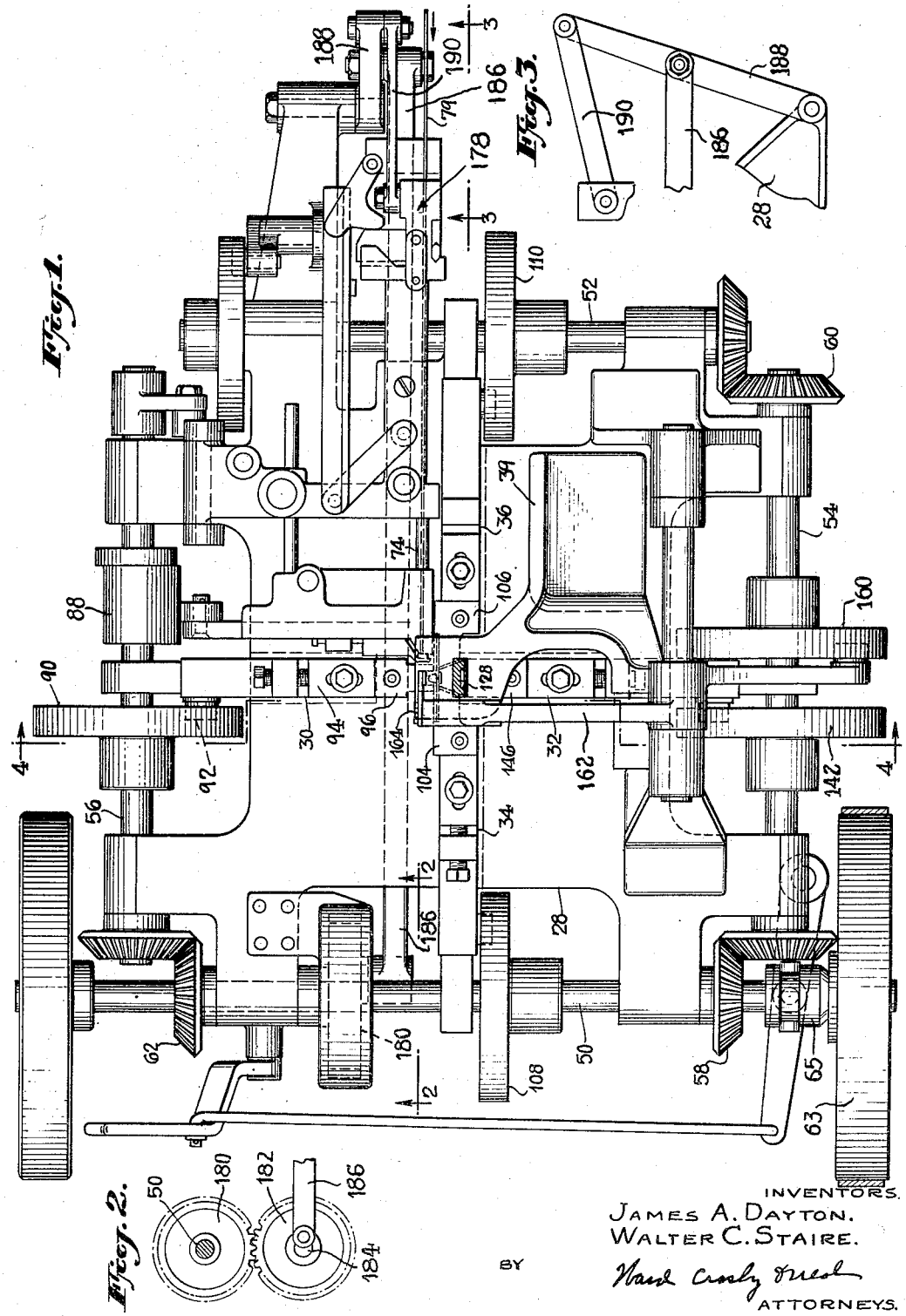
INVENTORS.
JAMES A. DAYTON.
WALTER C. STAIRE.
BY
ATTORNEYS.

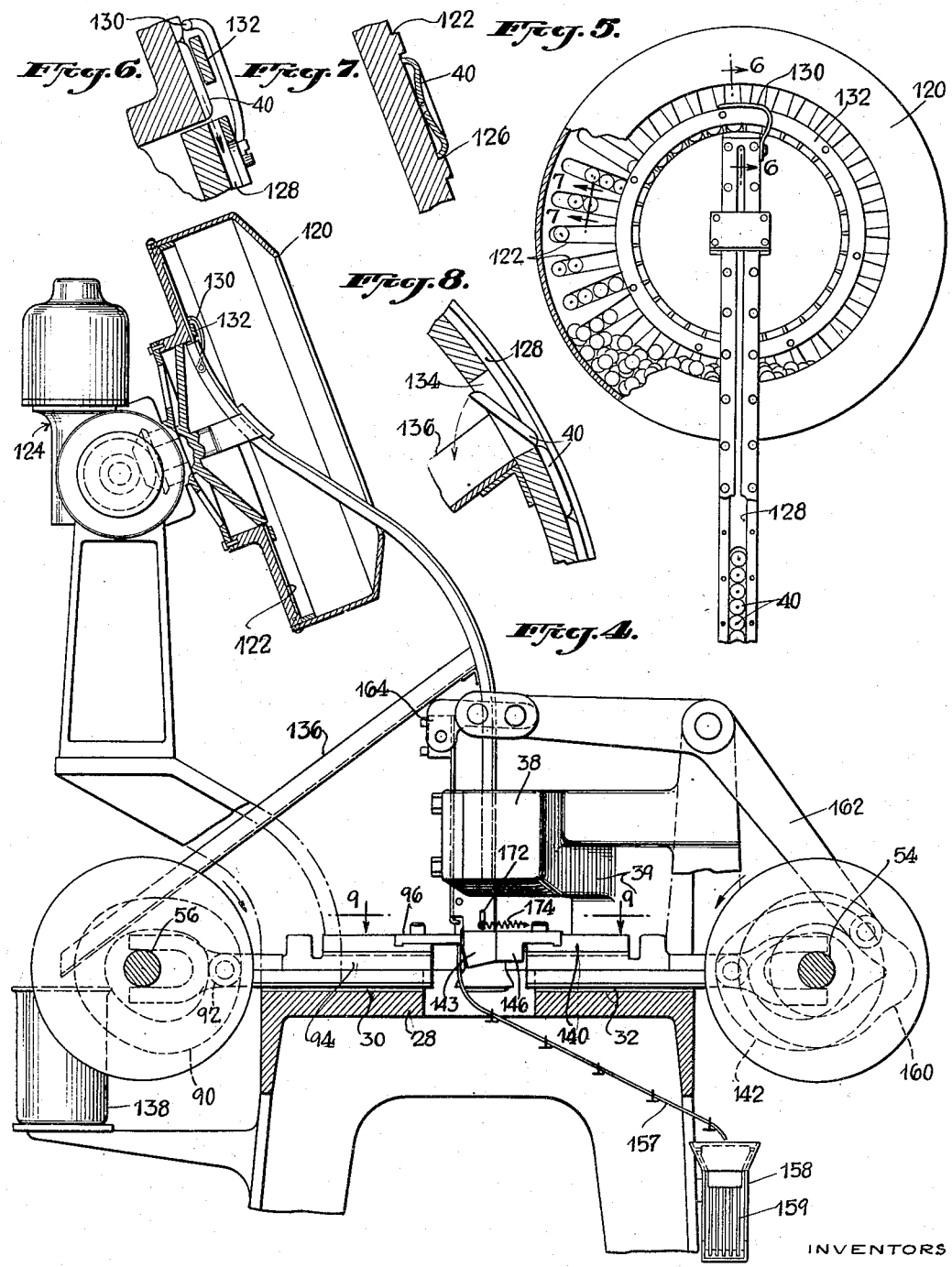

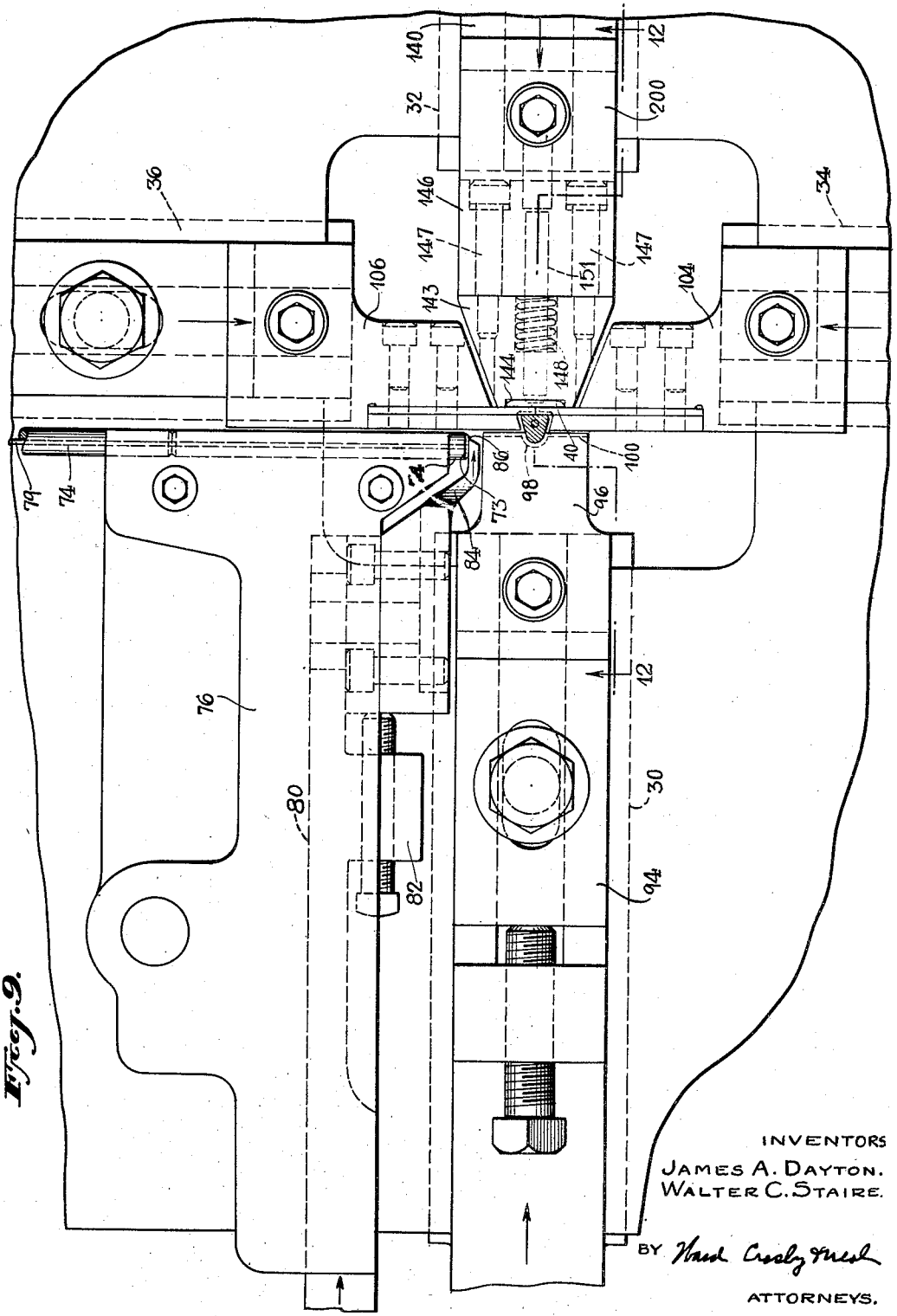

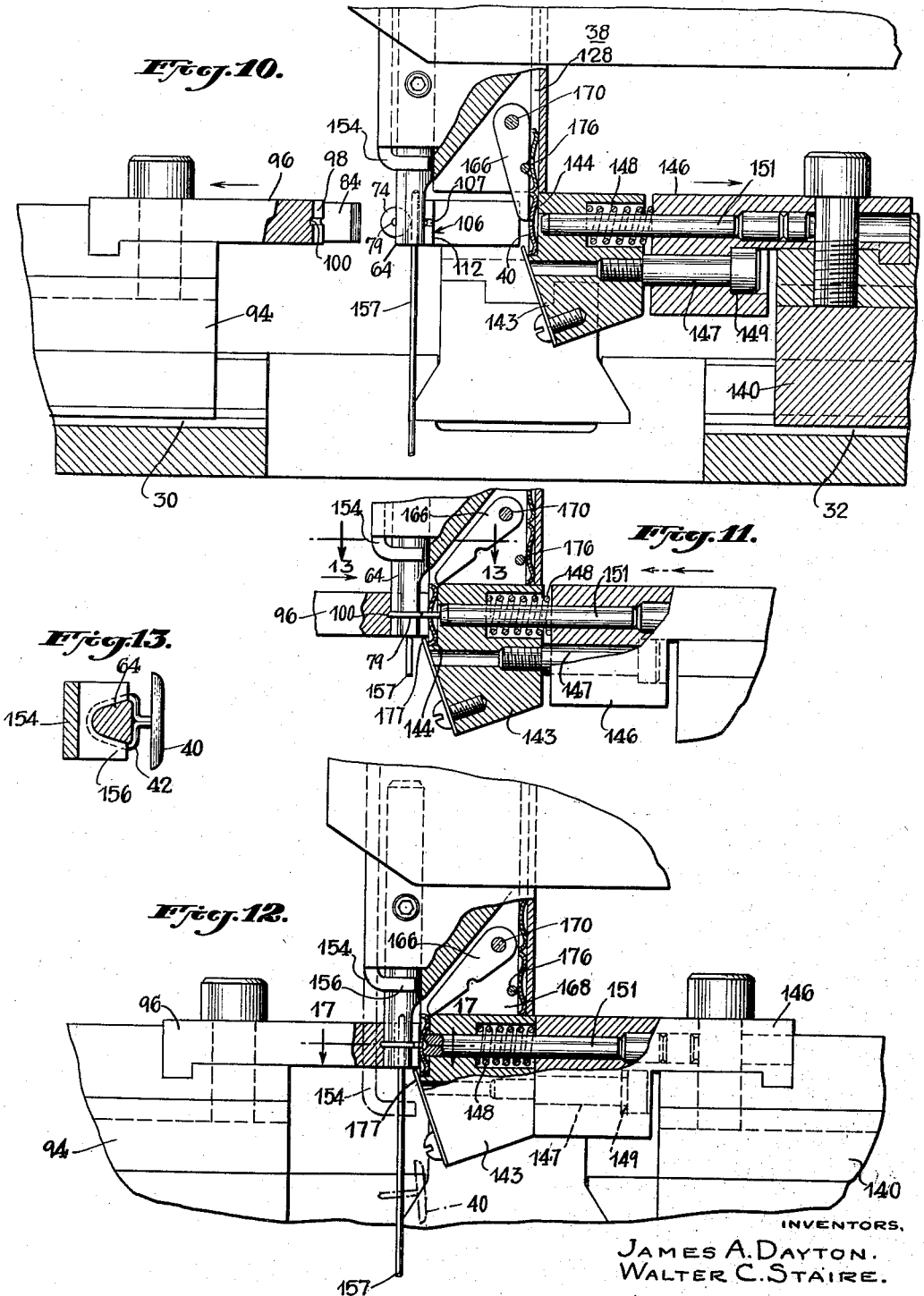

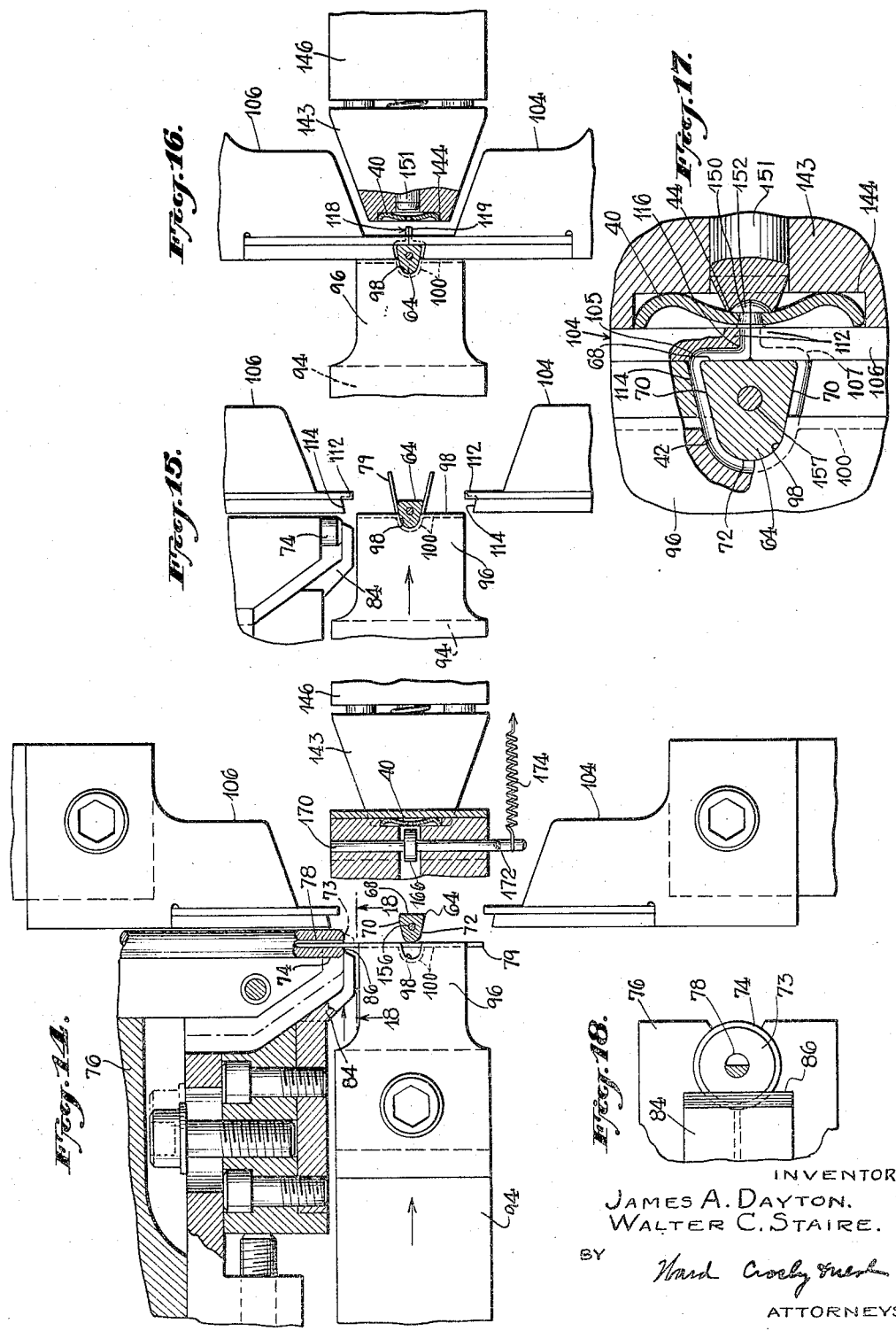

July 24, 1951 J. A. DAYTON ET AL 2,561,912
APPARATUS FOR MAKING TUFT BUTTONS AND THE LIKE
Filed July 15, 1947 6 Sheets-Sheet 6
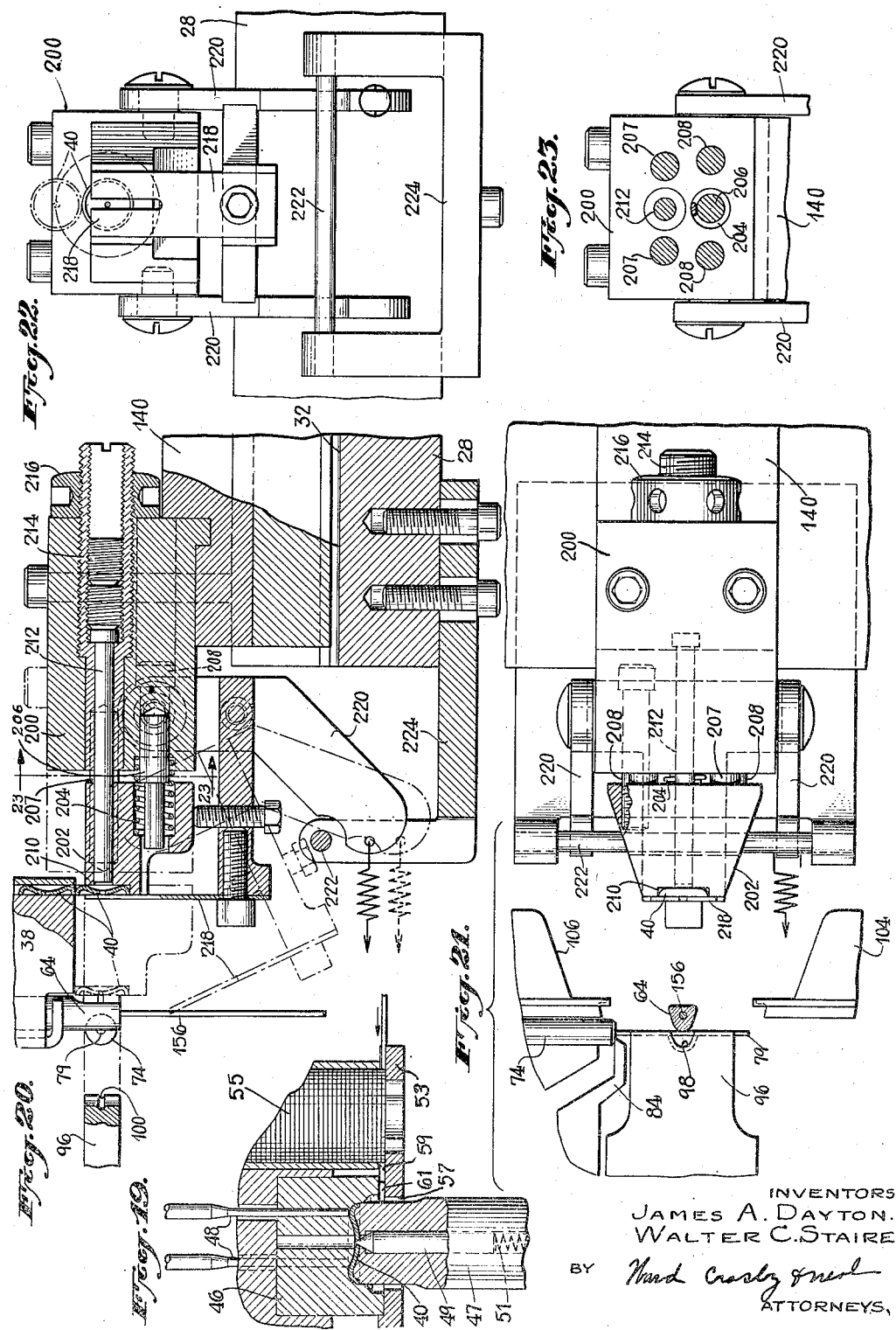
INVENTORS.
JAMES A. DAYTON.
WALTER C. STAIRE.
BY
ATTORNEYS.

Patented July 24, 1951

2,561,912

UNITED STATES PATENT OFFICE 2,561,912

APPARATUS FOR MAKING TUFT BUTTONS AND THE LIKE

James A. Dayton, Litchfield, and Walter C. Staire, Torrington, Conn., assignors to The Turner & Seymour Mfg. Co., Torrington, Conn., a corporation of Connecticut Application July 15, 1947, Serial No. 760,968

9 Claims. (Cl. 79—2)

This invention relates to a machine for making headed fastenings, and more particularly to a machine for making such fastenings having a shank suitably formed and secured in a head aperture.

The invention has to do with mechanism for forming a shank of any particular shape, and the securing of a free end of the shank in an aperture in a head member. The invention further relates to the forming of the head member to provide a tapered central aperture to receive the free end of the shank, and the upsetting of the shank within the aperture to expand the shank into engagement with the wall of the tapered aperture, and the subsequent heading over of the shank end to engage the face of the head member at the smaller end of the tapered aperture.

The invention further provides for the forming of a button shank with a loop and shoulders spaced from the head to be subsequently secured to the shank, and mechanism for rigidly holding the shank thus formed during upsetting of the shank metal within an aperture in the head as aforesaid.

Additionally there is provided a feeding mechanism for the heads of the fastening means adapted to deliver the heads in proper relation to receive the shanks, together with mechanism for positioning the heads upon their respective shanks, and for confining the upsetting of the shanks to the portion thereof adapted to directly engage the button head.

The above and other novel features of the invention will appear more fully from the following detailed description when taken in conjunction with the accompanying drawings. It is to be understood, however, that the drawings are employed for purposes of illustration only and are not designed as a definition of the limits of the invention, reference being had for this purpose to the appended claims.

In the drawings, wherein like reference numerals indicate like parts—

Fig. 1 is a top plan view of the machine with overlying parts removed;

Fig. 2 is a wire feed power take off detail section taken substantially on the line 2—2 of Fig. 1;

Fig. 3 is another detail of the wire feed power take off taken substantially on the line 3—3 of Fig. 1;

Fig. 4 is a transverse section through the center of the machine, taken substantially on the line 4—4 of Fig. 1, showing the feed and discharge paths;

Fig. 5 is a front elevational view of the feed hopper drum shown in Fig. 4;

Fig. 6 is a sectional detail view taken substantially on the line 6—6 of Fig. 5;

Fig. 7 is a sectional detail taken substantially on the line 7—7 of Fig. 5;

Fig. 8 is an enlarged sectional detail of a part of the feed channel of Fig. 4;

Fig. 9 is an enlarged top plan view of the central portion of the apparatus with parts in section, showing the mechanism in finishing position;

Figs. 10, 11 and 12 are fragmentary enlarged side views partly in section of the tufting button head feed and stem riveting plunger showing successive stages of operation, Fig. 12 being taken substantially on the line 12—12 of Fig. 9, and corresponding otherwise to the stage of operation there shown;

Fig. 13 is a detail sectional view of the stripper taken substantially on the line 13—13 of Fig. 11;

Figs. 14, 15 and 16 are fragmentary plan views with parts in section of the stem shaping mechanism in successive stages of operation;

Fig. 17 is an enlarged sectional view of a tufting button positioned within the apparatus at the riveting stage and is a section taken substantially on the line 17—17 of Fig. 12;

Fig. 18 is an enlarged sectional view of the wire feed and cutter, taken substantially on the line 18—18 of Fig. 14;

Fig. 19 is a longitudinal section of the dies employed to form the button heads;

Fig. 20 is a longitudinal sectional view of a modified form of plunger;

Fig. 21 is a plan view of the plunger of Fig. 20;

Fig. 22 is a front end elevation of the plunger of Fig. 20; and

Fig. 23 is a transverse section taken on the line 23—23 of Fig. 20.

Referring to the drawings, and more particularly to Figs. 1 and 4 for a general layout of the machine, there is shown a frame or bed plate 28 having horizontal ways or slides 30 and 32 and 34 and 36 arranged at right angles to one another, and a material feed 38 extending vertically above the line of intersection of said ways. The vertical feed supported from a pedestal 39 is adapted to deliver tufting button heads (see Figs. 13 and 17) formed from disks into the central portion of the machine where half round or other suitably shaped wire cut in lengths is formed by jaws slidably arranged on said ways, into a loop 42, and the free ends brought together and swaged into a tapered aperture 44 in the button head 40. The frame is suitably provided with journals to receive horizontal power shafts 50 and 52 and 54 and 56 extending around the frame and at right angles to the ways, the shafts being intergeared with one another by bevel gears 58, 60 and 62, so that all shafts operate at the same speed from the power shaft 50.

The formation of the wire loop 42 is accomplished by sequential operation of various jaws upon the ways described in combination with a forming anvil or bar and intermittent wire feeding mechanism. As will appear in Figures 10 and 17, a suitably shaped forming bar or anvil 64 supported in depending fashion from the feeding head 38 is rigidly secured to the pedestal 39. The anvil is somewhat arrow head in cross section, having a substantially flat base 68, and sloping sides 70 joined by a rounded surface 72. The lower end of the bar 64 is located so as to intersect a wire feed path formed by the feed tubes 74 mounted on the machine bed plate by a bracket 76. The bore 78 of the feed tube may be adjusted so as to deliver half round wire 79 with its flat side substantially tangential to the rounded surface 72 of the bar or anvil 64.

Slidably arranged within a guide channel 80 in the bracket 76, is a reciprocating cutting bar 82 having adjustably secured thereto a cutting head 84, with the cutting or shearing edge 86 offset and wiping the nose 73 of the wire feed tube 74 for shearing action. The bar is suitably reciprocated by a cam or eccentric 88 mounted upon the shaft 56.

Also driven by the shaft 56 is a cam 90 acting through follower 92, upon a reciprocating ram 94 traveling on way 30. The ram 94 is provided with a head 96, having a complementary notch 98 adapted to embrace the anvil or bar 64, and is also provided with a half round groove 100 extending horizontally across the face of the head and into the face of the notch 98. The groove is aligned to receive a length of wire extending from the feed tube 74 and, through operation of the ram, wrap the wire about the forming bar 64, it being understood that the cutter 84 is so timed as to sever a predetermined length of wire when symmetrically disposed about the bar 64 and at approximately the time the ram commences to bow the wire about the forming bar 64. Completion of the stroke of the ram causes the wire to take the shape shown in Fig. 15, with the flat side of the half round wire bearing against the bar 64.

In order to bend the free ends of the wire to form a shank for affixation within the aperture 44 in the button head 40, a pair of forming jaws 104 and 106 reciprocating on ways 34 and 36 are provided. Simultaneous motion is transmitted to the jaws by similar cams 108 and 110 fixed to shafts 50 and 52, so that the forming tongues 112 and shoulders 114 (see Figs. 15-17) will close about the anvil or bar 64 in symmetrical fashion and bend the wires about the substantially flat surface 68, and at the same time provide a knee or right-angle bend at 116 so that the two half round ends combine to form a cylindrical shank 118. The tongues 112 each have half round grooves 105 and 107 in their faces adapted to complementally receive the half round wire. The grooves 105 and 107, and the jaws in combination with the anvil or bar 64, and the backing of the ram 94, are adapted to hold, and confine the shank wire in the position shown in Figs. 16 and 17.

With the ram 94 and the jaws 104 and 106 held in forming position about the anvil, the free end 119 of the shank 118 is securely fixed for placing thereon a button head with its aperture loosely but closely surrounding the shank. A swaging and riveting operation expands and enlarges the free end 119 of the shank into tight engagement with the taper bore 44 of the button head, with subsequent riveting over the end of the shank.

It will be seen that the button head is formed from flat discs of metal with a central hole, by suitable mating dies which effect the final rounded flange and dished central part, the dies actually closely conforming to the surface contours of the button. The dishing action stretches the metal in such a manner as to render the aperture tapered, so that a shank when expanded therewithin and riveted over, will be securely positioned between the taper and the rivet head.

It will also be seen that the shank is securely held during the upsetting operation and confined by the jaws, ram and forming bar to substantially prevent any upset except along the free end 119 of the shank and within the button head aperture.

To form the dished button head with the tapered hole 44 and rolled edge 45, mating dies 46 and 47 with a yielding countersink punch 49, and suitable ejectors 48, may be employed (see Fig. 19) in conjunction with a suitable press not shown, the dishing operation tending to deform a cylindrical hole in a flat blank into a tapered hole, and the center punch tending to slightly bevel or countersink the opening at its larger end and assist the formation of the taper. The centering punch or countersink 49 is biased by a preloaded spring 51, for application of a predetermined pressure.

The dies coact with a feed guide 53 along which flat disc blanks are fed one at a time into the path of the die 47 from a stack 55. The guide is provided with a shallow channel 59, and the die 46 is correspondingly channelled as at 61, the width being slightly greater than the blank diameter, and slightly deeper than the blank thickness. The aperture 57 in the slide is of a diameter sufficient to support the marginal edge of a flat disc, prior to rolling of the edge. The consequent reduction in diameter permits the shaped head to clear the aperture 57.

The button head feed mechanism is generally shown in Fig. 4 in which there is provided a rotary drum-like feed hopper 120 rotating on an inclined axis and having radial sorting grooves 122 in its end face. The hopper is provided with a motor drive 124, and the hopper grooves have sharp angular walls of a depth less than the button thickness so as to pick up button heads, as at 126, provided the rounded or rolled side thereof is up with reference to the face, the grooves being too shallow to engage the rounded top face of the button heads. The heads when properly arranged in the grooves are brought into position for dropping into a rectangular sectioned chute 128 adapted to feed the heads to a position suitable for upsetting the shank stem therein. A wire guard 130 and guard strip 132 within the hopper assure correct positioning of the heads for alignment with the channel 128, the wire 130 tending to kick out any head which may be wrongside up or not properly seated in its groove.

The chute is provided with a relief opening 134, and a by-pass chute 136, so that the number of button heads in the vertical portion of the chute will remain constant for even loading, the excess by-passing through the opening 134 into a bin 138. The lower end of the chute 128 terminates at a reciprocating plunger 140 adapted to reciprocate on way 32, power being applied by the cam 142 keyed to shaft 54. The plunger head 143 is provided with a recess 144, of the correct size and shape to receive a single button head, and is adapted to cut off the supply of heads when reciprocated to the left, as shown in Figs. 11 and 12. The plunger head is mounted for slight movement with respect to the plunger proper 146, upon dowel pins 147 and is biased to an advance position by a coil spring 148, such position being determined by the shoulder 149 formed by the head of the dowel pins 147. The button head is thus positioned and held with the shank free end 119 within the aperture 44 of the head, with the button head against the jaws 104 and 106, while the ram completes its stroke, bringing a heading punch 151 into engagement with the shaft 118, upsetting the shank, and expanding the same into the tapered aperture thereof as at 150 with subsequently riveting over of the shank ends as at 152 (see Fig. 17 and also Fig. 12) in the riveting recess of the punch as provided.

Upon completion of the heading punch movement just described, all of the reciprocating parts, the jaws 104 and 106, the plunger 146 and the ram 94 are withdrawn through action of their respective cams, and thereafter a stripper 154, having a bifurcated end 156 is caused to slide downwardly upon the bar 64 to force the shank to slide off the end of the bar onto a guide wire 157 secured in the end of the bar 64 and adapted to guide the tufting buttons to a suitable receptacle 158. Movement of the stripper is effected through a cam 160 on shaft 54, the same actuating a bell crank and follower 162 connected to the upper end of the stripper bar as at 164. The receptacle is provided with a wire grid 159 to screen the buttons from foreign particles and scrap.

When the plunger head is returned to the position shown in Fig. 10, a button head is permitted to drop into place in the recess 144 and is held in position by a spring biased tongue or dog 166 mounted in a slot 168, and keyed to a shaft 170. The shaft is provided with a crank 172 and suitable biasing spring 174. A stop pin 176 limits the travel of the tongue to prevent binding upon the heads, and permit free travel of button heads therepast. A light flexible spring lip 177, in the form of a thin strip attached to the head 143 forms a ledge to seat the button heads in the recess 144, and is flexed over the button head upon the return stroke of the head.

While all of the jaws, ram, and plunger are in their retracted position, the wire feed mechanism 178, driven from shaft 50 through the gears 180 and 182 and counter crankshaft 184, link 186, lever 188 and connecting rod 190, is caused to advance a section of wire of predetermined length through the wire feed tube 74 for the succeeding button. The reciprocating wire feed mechanism, which may be of any well known form, simply grips the wire in a manner well understood in the art, advances the same, and thereafter holds the wire in advanced position, while being cut and until the succeeding cycle when the wire is advanced an additional length. It will be seen that all the various element sliding on the ways are suitably timed in their relative motions, and that power is applied to the entire apparatus through a clutch 65 and drive pulley 63.

In Figures 20 to 23 inclusive, a somewhat modified form of plunger, and heading punch is shown in which a plunger carried bifurcated retaining member 218 is provided in place of the chute carried dog 166 of Figs. 10–12, and spring lip 177. The plunger body 200 is provided with a plunger head 202, resiliently biased by a spring 204 arranged on a guide pin 206. Dowel pins 207 and other shouldered dowel pins 208 screw threaded in the head 202 and slidable in the plunger body 200, similar to pins 147 (see Fig. 10) are provided to limit the spring biased movement. The head 202 is provided with a button head receiving recess 210, and a heading punch 212 extending through the head 202 and secured to the plunger 200 in an internally and externally threaded adjustment sleeve 214, locked in place by the capstan nut 216. To hold a button head in place in the recess 210, the bifurcated retaining member in the form of a resilient forked strip 218 is mounted on a pair of swinging arms 220. The arms are adapted to engage a stationary bumper bar 222, to retract the forked strip 218 just prior to the plunger head reaching the position shown in Fig. 19. The bumper bar 22 is supported upon a bracket 224 secured to the frame or bed plate 28.

From the foregoing description it will appear that there is provided an apparatus capable of rapidly producing tufting buttons of the form shown, and which may be altered to secure various shaped shanks within a tapered aperture in a button head, by an upsetting and riveting action, and that the various jaws and rams not only act to shape the particular shank disclosed, but also act to support and rigidly hold the shank during the upsetting operation. In this latter function, the particular shape to which the jaws and ram are adapted may be widely varied to suit any form of shank for the purpose of rendering absolute support thereto during the upsetting operation.

While the invention has been illustrated and described in a single apparatus adapted to specifically fabricate a specific construction, with a modification of a portion thereof, it is to be understood that the invention is not limited thereto but may be embodied in various modified forms. As many changes in construction and arrangement of parts may be made to accommodate variations in the fabricated construction desired without departing from the spirit of the invention, as will be apparent to those skilled in the art, after an understanding of the invention, reference will be had to the appended claims for a definition of the limits of the invention.

What is claimed and desired to be secured by Letters Patent is:

1. In apparatus for forming tufting buttons having an apertured head and a looped shank secured therein by upsetting which comprises, a forming bar, a ram adapted to bend a predetermined length of wire symmetrically about said bar to form a bight having free ends, a pair of opposing jaws mounted for movement transversely of said ram and adapted to form said free ends about the remainder of said bar and arrange the extreme end portions in parallel contacting relation, means for feeding an apertured head in threading relation upon the end portions of said wires, and means acting axially of said wire to compress said wire and expand and upset at least a part of said extreme end portions laterally into aperture wall engagement with said head.

2. In a forming and upsetting machine for forming shanks and affixation thereof to apertured heads, a forming bar, a ram having a recess complemental to a portion of said bar, and a wire-receiving groove therein, means for feeding a predetermined length of wire between said ram and bar, in a position for bowing about said bar upon relative movement of said ram toward the bar, supplemental opposed jaws having wire-receiving grooves, and recesses to complementally embrace the remainder of said bar, and form said wire about said bar with the ends thereof arranged in parallel contacting relation, said jaws, bar and ram acting together to rigidly position said wire with its ends projecting from said jaws, means for threading a head having a tapered aperture onto the ends of said wires, with the enlarged end of the taper adjacent said jaws, and means for compressing said wires axially to upset and expand said wires into aperture wall engagement with said head, and means associated with said last named means for riveting the end of said wires against said head.

3. An apparatus for forming tufting buttons having an apertured head and a looped shank secured therein by upsetting which comprises in combination, a symmetrical forming bar, a ram movable transversely of said bar and adapted to bend a predetermined length of wire symmetrically about said bar to form a bight having free ends, means for feeding a length of wire across the surface of said bar in the path of said ram, and means for severing a section of said wire upon joint contact of said bar and ram therewith, a pair of opposing jaws mounted for movement transversely of said ram and said bar and adapted to form the free ends of the length of wire about the remainder of said bar and arrange the extreme end portions in parallel contacting relation, means for feeding an apertured head in threading relation upon the end portions of said wires, and means acting axially of said wire to compress said wire and expand and upset at least a part of said extreme end portions laterally into engagement with said aperture.

4. In a forming and upsetting machine for forming shanks and affixation thereof to apertured heads, a forming bar, a ram having a recess complemental to a portion of said bar, and a wire receiving groove therein, means for feeding a predetermined length of wire between said ram and bar in a position for bowing about said bar upon relative movement of said ram toward the bar, cutting means for severing said predetermined length of wire as said ram initially commences to bow the wire about said bar, supplemental opposed jaws having wire receiving grooves and recesses to complementally embrace the remainder of said bar, and form said wire about said bar with the ends thereof arranged in parallel contacting relation, said jaws, bar and ram acting together to rigidly position said wire with its ends projecting from said jaws, means for threading a head having a tapered aperture onto the ends of said wires, with the enlarged end of the taper adjacent said jaws, and means for compressing said wires axially to upset and expand said wires into aperture wall engagement with said head, and means associated with said last named means for riveting the end of said wires against said head.

5. A forming and upsetting machine for forming shanks, and affixation thereof to apertured heads, comprising in combination, a plurality of loop forming means including movable jaws adapted to form a section of wire into a loop with the free ends thereof extending parallel and in contact with one another, said loop forming means adapted to hold said parallel ends against lengthwise movement and radial expansion, save for the extreme end portions, means adapted to move in parallel relation to the extending ends and adapted to hold an apertured button head having a thickness substantially less than the length of the extreme end portions in a plane transverse to said ends with the aperture in alignment with said ends, said means being adapted to thread a button head upon said extreme ends and hold the same against said jaws, and means for upsetting said extreme ends axially, while held against longitudinal movement by said jaw means to expand the wire radially into contact with the button head aperture.

6. A forming and upsetting machine for forming shanks, and affixation thereof to apertured heads, comprising in combination, a plurality of loop forming means including movable jaws adapted to form a section of wire into a loop with the free ends thereof extending parallel and in contact with one another, said loop forming means adapted to hold said parallel ends against lengthwise movement and radial expansion, save for the extreme end portions, means adapted to move in parallel relation to the extending ends and adapted to hold an apertured button head having a thickness substantially less than the length of the extreme end portions in a plane transverse to said ends with the aperture in alignment with said ends, said means being adapted to thread a button head upon said extreme ends and hold the same against said jaws, and means for upsetting said extreme ends axially, while held against longitudinal movement by said jaw means to expand the wire radially into contact with the button head apertured, said last named means being adapted to upset the tip ends to form a rivet head engaging said button.

7. A forming and upsetting machine comprising means to embrace and securely hold a stem portion of a button shank against longitudinal movement, with the major portion thereof confined against lateral expansion, and with the stem end portion extending beyond said means, button head holding means reciprocable toward said stem holding means adapted to hold an apertured button head for threading the end portion within the head aperture, and means carried by said head holding means, and movable longitudinally thereof for engaging the end of said end portion and upsetting said end portion axially thereof to cause said end portion to expand in diameter into snug engagement with said aperture.

8. A forming and upsetting machine comprising means to embrace and securely hold a stem portion of a button shank against longitudinal movement, with the major portion thereof confined against lateral expansion, and an end portion extending beyond said means, button head holding means reciprocable toward said stem holding means adapted to hold an apertured button head for threading said stem end portion within the head aperture, and means carried by said head holding means, and movable longitudinally thereof for engaging the end of said end portion and upsetting said end portion axially thereof to cause said end portion to expand in diameter into snug engagement with said aperture, and a riveting surface on said upsetting means for riveting over the end of the stem against a button head threaded thereon.

9. An apparatus for forming tufting buttons having a taper apertured head and a looped shank secured therein which comprises in combination, a symmetrical forming bar, a reciprocating ram movable transversely of said forming bar having a recess complementary to said bar and a transverse wire receiving groove, means to feed a length of wire between said ram and transversely across said forming bar, means for severing a section of said wire symmetrically disposed with respect to said forming bar upon joint contact thereof by said ram and bar, jaw means for forming the ends of the wire section ends thereof in contacting parallel relation to about the back of said bar and for bringing the form a stem, a reciprocating plunger having a button head receiving recess, adapted to thread a button head with a central aperture upon said stem, said plunger having an upsetting and riveting punch in axial alignment with said stem, and adapted to engage the end thereof, and means for moving said punch relative to said head, to upset said stem for expansion into engagement with the walls of the button head aperture, a stationary gravity feed channel for said button head having a discharge end adapted for alignment with said plunger head receiving recess when in retracted position, and means for limiting the number of buttons in said feed channel.

JAMES A. DAYTON.
WALTER C. STAIRE.

REFERENCES CITED

The following references are of record in the file of this patent:

UNITED STATES PATENTS

| Number | Name | Date |
|---|---|---|
| 67,865 | Fowler | Aug. 20, 1867 |
| 376,895 | Ludington | Jan. 24, 1888 |
| 474,320 | Hardman | May 3, 1892 |
| 492,534 | Lieb | Feb. 28, 1893 |
| 754,125 | Capewell | Mar. 8, 1904 |
| 1,118,110 | De Francisci | Nov. 24, 1914 |
| 1,459,888 | Heyman | June 26, 1923 |

FOREIGN PATENTS

| Number | Country | Date |
|---|---|---|
| 25,648 | Great Britain | Nov. 14, 1896 |

Certificate of Correction

Patent No. 2,561,912                                           July 24, 1951

JAMES A. DAYTON ET AL.

It is hereby certified that error appears in the printed specification of the above numbered patent requiring correction as follows:

Column 6, line 20, for "bar 22" read *bar 222*; line 38, for "adapated" read *adapted*; column 9, line 10, strike out "ends thereof in contacting parallel relation to" and insert the same before "form" in line 12;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*